United States Patent
Fischer et al.

(10) Patent No.: US 6,444,762 B1
(45) Date of Patent: Sep. 3, 2002

(54) ANIONIC POLYMERIZATION PROCESS

(75) Inventors: Wolfgang Fischer; Konrad Knoll, both of Ludwigshafen; Wolfgang Loth, Bad Dürkheim; Volker Warzelhan, Weisenheim, all of (DE); Alain Deffieux, Bordeaux (FR); Philippe Desbois, Gradignan (FR); Michel Fontanille, Talence (FR); Stefan Lätsch, Bad Dürkheim (DE); Christian Schade, Ludwigshafen (DE); Hermann Gausepohl, Mutterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/242,464

(22) PCT Filed: Aug. 18, 1997

(86) PCT No.: PCT/EP97/04497

§ 371 (c)(1),
(2), (4) Date: Feb. 17, 1999

(87) PCT Pub. No.: WO98/07765

PCT Pub. Date: Feb. 26, 1998

(30) Foreign Application Priority Data

Aug. 19, 1996 (DE) .......................... 196 33 273
Aug. 19, 1996 (DE) .......................... 196 33 272
Apr. 11, 1997 (DE) .......................... 197 15 036
Jul. 22, 1997 (DE) .......................... 197 31 419

(51) Int. Cl.⁷ ................................. C08F 2/02
(52) U.S. Cl. ................. 526/64; 526/173; 526/183; 526/335; 526/346; 502/157
(58) Field of Search ............ 526/64, 183, 173, 526/335, 346; 502/157

(56) References Cited

U.S. PATENT DOCUMENTS 3,716,495 A * 2/1973 Hsieh et al. ............... 252/431
4,311,803 A * 1/1982 Smith et al. ............... 525/53
5,391,655 A 2/1995 Brandstetter et al. ......... 526/64

FOREIGN PATENT DOCUMENTS

| DE | 1292848 | 4/1969 |
| DE | 2263104 | 7/1973 |
| EP | 592912 | 4/1994 |
| EP | 595119 | 5/1994 |
| WO | 97/33923 | 9/1997 |

OTHER PUBLICATIONS

Priddy et al., *J. of App. Poly. Sci.*, 37, 393–402, 1989.
Welch, *J. of Amer. Chem. Soc.*, 82, 1960, 6000–6005.
Hsieh et al. *Macromolecules*, 19, 1966, 299–304.

* cited by examiner

Primary Examiner—David W. Wu
Assistant Examiner—William Cheung
(74) Attorney, Agent, or Firm—Keil & Weinkauf

(57) ABSTRACT

A process for the continuous anionic polymerization or copolymerization of styrene or diene monomers using an alkali metal alkyl compound as polymerization initiator is carried out in the presence of an alkyl- or arylmetal compound of an element which occurs in at least divalent form as rate regulator, preferably under non-isothermal conditions and without back-mixing in a tubular or tube-bundle reactor, preferably using an alkyl- or arylmetal compound A of the formula $R^1M^1$ and an alkyl- or arylmetal compound B of the formula $R^2{}_nM^2$ in a molar ratio between B and A of from 0.1:1 to 500:1, where $M^1$ is Li, Na or K;

$R^1$ is hydrogen, $C_1$–$C_{20}$-alkyl, $C_6$–$C_{20}$-aryl, or $C_7$–$C_{20}$-alkyl-substituted aryl;

$M^2$ is an n-valent element from group 2a, 2b or 3a of the Periodic Table; and $R^2$ is hydrogen, halogen, $C_1$–$C_{20}$-alkyl or $C_6$–$C_{20}$-aryl; and a special anionic polymerization initiator containing no Lewis base.

24 Claims, No Drawings

ANIONIC POLYMERIZATION PROCESS

The present invention relates to a particularly economical and safe process for the preparation of a styrene or diene polymer or a styrene-diene block copolymer by anionic, preferably continuous polymerization of the corresponding monomers using an alkali metal alkyl compound as polymerization initiator.

It is known in general terms that although anionic polymerization proceeds to completion, ie. to 100% conversion, it also proceeds very quickly. Apart from selecting the lowest possible temperature, the reaction rate could only be reduced by selecting a lower concentration of the polymerization initiator; however, this would result in the formation of only a few, very long chain molecules, ie. an undesirably high molecular weight would be obtained. Owing to the considerable heat evolution and the difficulty of dissipating the heat from a viscous solution, restriction of the reaction temperature is not very effective.

An excessively high reaction temperature has particularly disadvantageous consequences, especially in block copolymerization, since thermolysis disrupts the formation of uniform block copolymers and, if a coupling reaction is intended after the polymerization, the coupling yield would be unfavorably low.

The temperature must thus be controlled by appropriate dilution of the monomers, but this means that the reaction space needed becomes unnecessarily large, ie. the anionic polymerization can only be carried out at relatively low space-time yields in spite of the high reaction rate that can be achieved.

In the case of batch polymerization (ie. in a stirred reactor), the temperature could also be regulated via the monomer feed rate. However, this is virtually impossible in a continuous process without simultaneously changing other parameters.

It has hitherto been found satisfactory, in the cases where anionic polymerization cannot be avoided, ie. in block copolymerization, to carry out the reaction, in spite of the unpopularity of the batch method, in a stirred reactor, as described, for example, in German Patents 13 01 496 and 25 50 227, and to adjust the reaction rate by regulating the feed of fresh monomer. A major potential problem here is forced chain termination caused by the slightest impurities, which results in the desired structure not being achieved. If it is desired to prepare, for example, three-block copolymers, mixtures containing a proportion of two-block copolymers or homopolymers are obtained instead of the pure product. These mixtures have, for example, lower tear strengths.

In the processes described, in addition, only dilute polymer solutions are prepared since solutions having a high solids content do not allow good heat dissipation in the stirred reactor and are also difficult to handle, for example during discharge of the finished product from the reaction space.

Continuous anionic polymerization has recently been investigated by, inter alia, Priddy and Pirc (J. Appl. Polym. Sci.; 37 (1989) 392–402) using the example of continuous polymerization of styrene with n-butyllithium in ethylbenzene in a continuously stirred tank reactor at from 90 to 110° C. The mean residence time is greater than 1.5 hours. The authors also mention the difficulties arising if the polymerization is carried out in tubular reactors, which, owing to heat exchange, must have very small diameters. In particular, deposits of polymers of very high molecular weight occur on the tube walls. In addition, the authors mention the abovementioned fact that temperatures above 110° C. result in thermolysis through elimination of Li—H.

European Patent 592 912 claims that a higher monomer concentration or a better space-time yield can be obtained by a continuous process in a so-called SMR reactor, a tubular reactor with internals which promote cross-mixing. However, the examples given likewise use only relatively dilute polymer solutions; it was apparently impossible, even using a tubular reactor, to dissipate the heat of reaction sufficiently quickly.

In order to reduce the residual monomer content, polystyrene prepared by continuous bulk or solution free-radical polymerization processes must—as is always the case in free-radical polymerization—subsequently be freed from residual monomer ("degassed") by means of an extruder or thin-film evaporator. For thermodynamic reasons, however, depolymerization occurs at the high temperatures prevailing in the degassing apparatuses, which means that the residual styrene content is generally above 500 ppm (Kunststoff-Handbuch, Vol. 4, Polystyrene, Carl Hanser-Verlag 1996, page 124).

It is known that a significantly lower concentration of residual monomers can be achieved by anionic polymerization. However, anionic polymerization generally gives a molecular weight distribution which is too narrow for technical polymers, resulting in a low melt flow index and poorer flow behavior during processing.

The effect of Lewis acids and Lewis bases on the rate of anionic polymerization of styrene at 30° C. has been reported by Welch in J.A.C.S. 82 (1960), 6000–6005. For example, it has been found that small amounts of Lewis bases, such as ethers and amines, accelerate the n-butyllithium-initiated polymerization of styrene, whereas small or even stoichiometric amounts of Lewis acids, such as alkylzinc and alkylaluminum compounds, reduce or even completely suppress the polymerization rate. Hsieh and Wang, Macromolecules 19 (1966), 299–304, have investigated the complexing of approximately stoichiometric amounts of dibutylmagnesium with alkyllithium or the living polymer chain in the presence and absence of THF and have found that dibutylmagnesium reduces the polymerization rate of styrene and butadiene without affecting the stereochemistry.

U.S. Pat. No. 3,716,495 discloses initiator compositions for the polymerization of conjugated dienes and vinylaromatic compounds where more effective utilization of alkyllithium compounds as initiator is achieved by addition of, for example, diethylzinc and polar compounds, such as ethers or amines. However, this U.S. Patent requires a large amount of solvent and a reaction time of several hours, and accordingly the space-time yields are correspondingly low.

It is an object of the present invention to find an anionic polymerization process, in particular a continuous process and in particular one which can be carried out at a high rate even at high temperature, which allows control of the reaction rate even at high monomer concentrations—in some cases even in a solvent-free environment—and is therefore distinguished by being particularly economical, and which enables the preparation of polymers having a particularly low residual monomer content.

We have found that this object is achieved in accordance with the invention by polymerizing styrene or butadiene and/or technical equivalents thereof anionically and preferably continuously using alkali metal alkyl or aryl compounds in the presence of an alkyl- or arylmetal compound of an element which occurs in at least divalent form, in particular from the second or third main group or second subgroup of the Periodic Table.

These alkyl- or arylmetal compounds of elements which occur in at least divalent form are also referred to below as rate regulators or retarders.

The alkali metal alkyl or aryl compounds can also be replaced as initiator by an initiator-capable, low-molecular-weight product of the reaction of the alkyl- or arylmetal compound.

The direct subject of the invention is a process for the continuous anionic polymerization or copolymerization of styrene or diene monomers using an alkali metal alkyl compound as polymerization initiator, in the presence of an alkyl- or arylmetal compound of an element which occurs in at least divalent form as rate regulator.

Addition of the rate regulator (retarder) according to the invention allows the reaction rate to be reduced or the temperature increased, without disadvantages for the polymer properties, to the extent that the heat of polymerization liberated can be controlled, even at a high monomer concentration, and/or a high space-time yield is possible.

In the presence of a rate regulator according to the invention, side reactions, which can result in deactivation of the growing polymer chain—such as, for example, lithium hydride eliminations—are slowed, with the consequence that higher temperatures are possible than in the case of the reaction in the absence of these compounds. Performance of the reaction at higher temperatures may be necessary, for example, for the handling of relatively high-molecular-weight products or relatively highly concentrated polymer solutions.

The novel process can be applied to the polymerization of styrene, α-methylstyrene, p-methylstyrene, p-tert-butylstyrene, ethylstyrene, vinyltoluene, vinylnaphthalene, 1,1-diphenylethylene, butadiene, 2,3-dimethylbutadiene, 1,3-pentadiene, 1,3-hexadiene or isoprene, or mixtures thereof. Preference is given to styrene, 1,1-diphenylethylene and butadiene, and very particular preference is given to styrene. The monomers are advantageously employed in-the purity typically necessary in the process, for example by freeing the monomer or monomers from interfering attendant substances (for example residual moisture, polar substances or oxygen) immediately before feeding into the reaction space.

The novel process can be carried out in the absence of a solvent and at a temperature significantly above 100° C., at which melts or concentrated solutions of polymers can also be handled. If necessary, suitable solvents are, for example, cyclohexane, methylcyclohexane, hexane, heptane, isooctane, benzene, toluene, xylene, ethylbenzene, decalin, paraffin oil or suitable mixtures, where the initial monomer concentration should advantageously be at least 50% by weight. Even in the cases where a certain amount of solvent is to be used, the initial monomer concentration can be up to 90% by weight. If solvents are used, they are employed in the purity typically necessary in the process. The solvent from the process is preferably reused after separation from the product and purification where necessary.

The alkali metal alkyl or aryl compounds can be the compounds known in a similar context, in particular of lithium with alkyl, aryl or alkylaryl radicals each having from 1 or 6 or 7 to 20 or more carbon atoms respectively. They can be monofunctional or polyfunctional metal compounds. Suitable polyfunctional compounds are described, for example, in U.S. Pat. Nos. 5,171,800 and 5,321,093. Other suitable initiators, as mentioned above, are initiator-capable, low-molecular-weight products of the reaction of alkyl- or arylmetal compounds (for example butyllithium) with, for example, vinylaromatic or vinylidenearomatic compounds (for example diarylethylidene), as can be formed as precursors in anionic polymerization and can be obtained in stable form at correspondingly small amounts of vinylaromatic or vinylidenaromatic compound. It is advantageous to employ organolithium compounds, such as ethyl-, propyl-, isopropyl-, n-butyl-, s-butyl-, t-butyl-, phenyl-, hexyldiphenyl-, butadienyl- and polystyryllithium or the polyfunctional compounds hexamethylenedilithium, 1,4-dilithiobutane, 1,6-dilithiohexane, 1,4-dilithio-2-butene or 1,4-dilithiobenzene. Preference is given to n-butyl- and sec-butyllithium. The requisite amount of initiator is, depending on the desired mean molecular weight, generally in the range from 0.001 to 5 mol %, based on the amount of monomer.

The rate regulator is preferably a compound of an element from the second or third main group or second subgroup of the Periodic Table. For practical reasons, use is principally made of alkaline earth metal, zinc or aluminum alkyl or aryl compounds containing alkyl or aryl radicals having from 1 or 6 to 20 carbon atoms respectively. Instead of an alkyl- or arylmetal compound, use can be made of an alkylmetal or arylmetal halide or alkylmetal or arylmetal hydride, for example diethylaluminum chloride or dibutylaluminum hydride. It is possible to use compounds containing uniform or different radicals or mixtures of different compounds. Preference is given to alkylmagnesium, alkylaluminum or alkylzinc compounds, in particular the methyl, ethyl, propyl, butyl, hexyl, octyl or dodecyl compounds available as commercial products. Particularly preferred rate regulators are butylethylmagnesium, dibutylmagnesium, butyloctylmagnesium, dihexylmagnesium, diethylzinc, dibutylzinc, trimethylaluminum, triethylaluminum, triisobutylaluminum, tri-n-hexylaluminum, diisobutylaluminum hydride, diethylaluminum chloride or mixtures of these compounds with one another.

The rate regulator can be employed, for example, in a molar ratio of from 0.1:1 to 500:1, preferably from 0.5:1 to 100:1, in particular from 0.8:1 to 30:1, based on the amount of the alkali metal alkyl or aryl compound. In the case of polyfunctional compounds, this figure naturally applies to one equivalent of the corresponding metal compound.

In order to achieve optimum results, the various rate regulators are employed in specific mixing ratios in each case. For example, the initiator/retarder ratio for dibutylmagnesium is a ratio of from 1:0.1 to 1:500, preferably from 1:0.5 to 1:200, in particular from 1:1 to 1:50. Trimethyl-, triethyl- and triisobutylaluminum and diisobutylaluminum hydride are preferably employed in an initiator/retarder ratio of from 1:0.1 to 1:1, particularly preferably from 1:0.4 to 1:0.99, in particular from 1:0.7 to 1:0.98. Trihexylaluminum is preferably employed in an initiator/retarder ratio of from 1:0.5 to 1:500, particularly preferably from 1:0.8 to 1:100, in particular from 1:1 to 1:30.

In order to determine precisely the particular retarder/initiator ratio, it is expedient to carry out a preliminary experiment set up so that, through choice of the amount of retarder, the desired reaction temperature or reaction rate is not exceeded.

The rate regulators according to the invention do not act as initiators per se. However, they can likewise act as polymerization initiators in combination with the alkali metal compounds according to the invention. It is expedient to carry out a preliminary experiment and to adjust the reaction conditions—for example the type and amount of the organometallic components, the monomer concentration, the retarder/initiator ratio, the reaction temperature, the conversion or the residence times—so that the desired molecular weight is obtained.

When the molecular weight increase is complete, the "living" polymer ends can be reacted with the usual chain terminators or coupling agents for anionic polymerizations. Suitable chain terminators are proton-active substances or Lewis acids, for example water, alcohols, aliphatic and aromatic carboxylic acids, phenols and inorganic acids, such as carbonic acid and boric acid, or mixtures of such substances. The polymers can be coupled using polyfunctional compounds, for example polyfunctional aldehydes, ketones, esters, tin or silicon halides, anhydrides or epoxides, which gives polymers having twice the molecular weight or branched or star-shaped polymers.

The invention furthermore relates to a particularly suitable catalyst (initiator mixture) for carrying out the novel process. An initiator mixture of this type is preferably employed in the absence of a Lewis base (i.e. no Lewis base is added) and it comprises, for example, A: an alkyl- or arylmetal compound A of the formula $R^1M^1$ B: an alkyl- or arylmetal compound B of the formula $(R^2)_nM^2$ where $M^1$ is Li, Na or K;

$R^1$ is hydrogen, $C_1$–$C_{20}$-alkyl, $C_6$–$C_{20}$-aryl, or $C_7$–$C_{20}$-alkyl-substituted aryl;

$M^2$ is an n-valent (n=2 or 3) element from group 2a, 2b or 3a of the Periodic Table, and $R^2$ is hydrogen, halogen, $C_1$–$C_{20}$-alkyl or $C_6$–$C_{20}$-aryl, and where the molar ratio between $(R^2)_nM^2$ and $R^1M^1$ is, according to the invention, from 10:1 to 100:1.

Instead of an alkyl- or arylmetal compound A of the formula $R^1M^1$, constituent A can alternatively be an initiator-capable, low-molecular-weight product A' of the reaction of the alkyl- or arylmetal compound A, having the general formula $R^3(M^1)_x$, where x is an integer from 2 to 5 and $R^3$ is the x-valent radical of an aliphatic, aromatic-aliphatic or aromatic hydrocarbon. Suitable products $R^3M^1_x$ are formed, for example, in the reaction of smaller amounts of polyvinylated aromatic compounds with alkali metal alkyl compounds or can be obtained directly by reaction of an alkali metal with polyaryl compounds. These reaction products allow the preparation, in a manner known per se, of bi- or polyfunctional polymers—for example linear or star-shaped block copolymers.

A particularly preferred initiator mixture is employed as a solution in an aliphatic or cycloaliphatic hydrocarbon, contains no Lewis base and contains an alkyllithium compound having 2 to 6 carbon atoms as constituent A and an alkylmagnesium, alkylzinc or alkylaluminum compound as constituent B. Constituent B is particularly preferably dibutylmagnesium, dibutylzinc, triisobutylaluminum or tri-n-hexylaluminum.

The novel process can be carried out in any pressure- and heat-resistant reactor, it being fundamentally possible to use back-mixing or non-back-mixing reactors (i.e. reactors acting as stirred reactors or tubular reactors). Depending on the choice of initiator concentration and composition, the process procedure specifically used and other parameters, such as temperature and any temperature program, the novel process gives polymers of high or low molecular weight. Examples of suitable reactors are stirred reactors, tower reactors, loop reactors and tubular reactors or tube-bundle reactors with or without internals. Internals may be static or movable internals.

The width of the molecular weight distribution can be influenced in a known manner through the choice of reaction temperature (lower or higher), the way in which the initiator or monomers are added and the way in which the process is carried out.

It is advantageous to carry out the polymerization until conversion is complete, where the maximum temperature achieved can generally remain below 150° C. in the case of diene-containing monomers. Temperatures of up to 300° C., but preferably not above 250° C., may be advantageous in the case of diene-free monomers.

The novel addition of an organometallic compound of an element which occurs in at least divalent form allows the reaction rate to be significantly reduced or the temperature increased without disadvantages for the polymer properties; it is thus possible on the one hand to distribute the evolution of the heat of polymerization over a longer period and thus in a continuous process to adjust the time or—for example in a tubular reactor—local temperature profile. For example, it can be ensured that, for an initially high monomer concentration, high temperatures do not occur, and on the other hand a smooth polymerization at the same time as a high space-time yield is possible at the high temperature which ultimately occurs, for example at a more advanced conversion. Wall deposits no longer occur in this process.

The process enables preparation of new styrene polymers having a residual monomer content of less than 50 ppm, a cyclic dimer and trimer content of less than 1000 ppm, a nonuniformity $M_W/M_N$ of greater than 1.5 and a melt volume index $MVI_{200°\ C./5\ kg}$ of greater than 4 g/10 min. The invention therefore furthermore relates to styrene (homo) polymers having the properties indicated above.

The target products may be homopolymers or copolymers and mixtures thereof. Preferred products are polystyrene and styrene-butadiene block copolymers. It is also possible to use the novel process to prepare high-impact polystyrene (HIPS), where the rubbers used can be polybutadiene or styrene-butadiene block copolymers.

Although the process can also be operated discontinuously (batchwise), the real aim of the invention is, however, to carry out continuous polymerizations, in particular, as indicated at the outset, at high temperature, for which purpose various processes described in detail below are suitable.

One process which can be carried out at high monomer concentration and is distinguished by particularly economical operation and allows the preparation of polymers having a low residual monomer content and enables reliable control of the polymerization rate and thus temperature profile comprises carrying out the polymerization continuously under non-isothermal conditions and without back-mixing—preferably in a tubular or tube-bundle reactor—to full conversion, where the temperature at the reactor outlet generally does not exceed 300° C. The final temperature is preferably up to 250° C. This temperature should not be exceeded if a particularly low residual monomer content is desired. In many cases, a temperature of up to 200° C. will be sufficient. At said temperatures, the viscosity even of concentrated solutions or even melts is sufficiently low to enable them to be conveyed, circulated and finally discharged without mechanical damage.

The novel process can be carried out in any pressure- and heat-resistant tubular reactor and gives polymers with either high or low molecular weight, depending on the choice of initiator concentration. Examples of suitable reactors are tubular reactors or tube-bundle reactors with or without internals. Internals can be static or movable internals. It is possible to feed all the monomer to the reactor inlet; however, the process can also be used for process variants in which some of the monomer is fed in at a downstream point, for example during the copolymerization, which in this way is possible in a very straightforward manner, especially if a number of blocks are to be added one after the other.

The temperature of the starting mixture, i.e. at the reactor inlet, is advantageously not greater than 80° C.; an initial temperature of up to 30° C., for example from 0 to 30° C., is preferred. The temperature profile over the reaction zone is naturally dependent on the geometry of this zone. It is expedient to carry out a preliminary experiment set up, through the choice of the amount of polyvalent alkylmetal compound, so that the desired temperature is achieved at the reactor outlet or after complete conversion has been reached. This enables virtually complete conversion to be achieved in a favorable time. The residence time is, for example, from 0.1 to 1.5 hours, preferably not greater than 1.2 hours.

The polymerization in a tubular reactor could be carried out without a solvent, i.e. using the monomer as the only solvent, since the polymerization is substantially complete at the time when a high melt temperature occurs. If, however, a lower viscosity of the product melt is to be achieved without increasing the temperature, it is advisable to use a small amount of one of the usual solvents for anionic polymerization. Accordingly, the monomer concentration should advantageously be from 90 to 100% by weight.

An embodiment which is likewise advantageous in accordance with the invention, with special opportunities for product variation, comprises carrying out the reaction in a back-mixing reactor, with constant supply of fresh polymerization initiator and/or rate regulator together with or separately from the monomers.

A particular advantage of continuous polymerization in a back-mixing reactor is the broader molecular weight distribution achieved, which is frequently desirable for a balance between many properties of the product.

An example of a back-mixing reactor is the continuously stirred tank reactor (CSTR).

Steady-state conditions are advantageously ensured by carrying out the reaction under isothermal conditions.

The novel embodiment of the process in a back-mixing reaction space is generally carried out in stirred reactors or loop reactors, i.e. reaction spaces in which the back-mixing takes place by means of a product stream circulated in an unordered or ordered manner and to which fresh reactants are constantly fed and from which reactants which have more or less reacted are removed. It is also possible to use a combination of more than one back-mixing unit, for example a stirred reactor cascade. The reactors advantageously have a pressure-resistant design to the extent that they must withstand the vapor pressure of the reactants and auxiliaries. On the other hand, the reaction is not specifically promoted by pressure, as in most polymerization reactions. Suitable reactors are those fitted with conventional conveying devices, i.e. stirrers or propellers, for keeping the liquid in motion, and they are either fitted with internals, which may be static or movable, or have no internals.

The reaction temperature should be kept constant during the reaction but not exceed 300° C., preferably 250° C., particularly preferably 200° C., in the case of styrene monomers. If diene monomers are used, the reaction is advantageously carried out at a maximum of 150° C. If a stirred reactor cascade or other equipment having the same action is selected, the temperature may naturally vary and, for example, rise in the successive reaction spaces.

The conversion in continuous back-mixing reactors cannot—theoretically—be complete. However, it is possible, for example in a circulation reactor, to achieve virtually quantitative conversion through a suitable choice of the process parameters, for example the circulation ratio or the residence time; a conversion of up to 95%, preferably up to 90%, particularly preferably up to 80%, is advantageous.

The polymerization could be carried out solvent-free per se, i.e. using the monomer as the only solvent. However, the initial concentration of monomer and solvent is advantageously selected so that—at a corresponding conversion—a solids content of up to 90%, preferably 80%, particularly preferably up to 70%, is established. Depending on the reactor type selected, a solids content of only 30–50% is sometimes set in order, for example, to maintain adequate motion of the reaction mixture. In order to remove the solvent and/or—in the case of incomplete conversion—residual monomer, the mixture is subsequently fed to a suitable degassing device. In order to support the degassing, the product may also be subjected briefly to higher temperatures, for example up to 350° C. In this case, products having low contents of residual monomers and oligomers are obtained even if complete conversion has been avoided from the very beginning.

Another possible process variant arises if the novel process is carried out in at least two reaction zones.

The first reaction zone serves for prepolymerization and is in the form of a back-mixing unit having a heat exchanger. It can be configured as a stirred reactor or as a circulation reactor with or without static mixers and may, if desired, be subdivided, for example in the form of a stirred reactor cascade. A hydraulic circulation reactor—i.e. one completely filled with liquid—may be advantageous, particularly if the reactor contents have relatively high viscosity. The desired conversion depends on the viscosity of the reaction mixture that can be dealt with and is generally chosen to be as high as possible, so that the residence time up to complete conversion in the subsequent second reaction zone is as short as possible and the maximum temperature is as low as possible so that significant damage or depolymerization does not occur. The reaction in this first reaction zone is advantageously continued to a conversion of from 20 to 80% by weight, preferably from 40 to 60% by weight. The polymerization temperature in the first reaction zone is from 20 to 150° C., preferably from 40 to 120° C., and very particularly preferably from 60 to 100° C.

The residence time in the first reaction zone is, for example, from 0.05 to 5 hours. A residence time of at least 0.3 hours is preferred. The heat of polymerization can be dissipated by, for example, evaporative cooling if stirred reactors are used and through the wall in the case of circulation reactors.

The monomers, the initiator and the retarder can be introduced at a single point; however, it is also possible to feed in a portion of the monomers, initiator or retarder at a further point, for example downstream. This enables, for example, a multimodal molecular weight distribution to be achieved. In a preferred procedure, the initiator and retarder, diluted with a hydrocarbon, for example n-hexane, heptane, cyclohexane or paraffin oil, are fed together to the first reaction zone. If necessary, a solubilizer, for example benzene, toluene, xylene, ethylbenzene, naphthalene or diphenylethylene, can also be used. The total amount of solvent added in this way should generally not be greater than 30%, preferably not greater than 10%, based on the amount of monomer, in order to make later work-up as simple as possible. It may be possible to avoid using a special solvent, i.e. it may be possible to use the monomer as solvent for the resultant polymer. Avoidance of a solvent is advantageous if the reaction is carried out adiabatically in the second reaction zone.

The second reaction zone serves to complete the reaction. Any pressure- and heat-resistant reactor which is essentially free from back-mixing can be used for this purpose. Suitable reactors are in particular tubular reactors or tube-bundle reactors with or without internals. Internals can be static or movable internals. It is also possible to use annular disk reactors or tower reactors.

The temperature profile in the second reaction zone over the tube length is naturally dependent on the geometry of this zone and on the conversion achieved in the first reaction zone. It is advantageous to carry out a preliminary experiment set up so that a temperature of 150 to 250° C. is achieved at the reactor outlet in the second reaction zone, i.e. after complete conversion has been achieved, but a temperature of 300° C. is not exceeded. This means that complete conversion is achieved in a favorable time. In practical terms, complete conversion means that no more than 100 ppm of residual monomer remain. If, however, an existing degassing device is to be used further, a conversion of less than 99%, for example from 95 to 98%, may also be adequate. In these cases, a residual content of greater than 100 ppm is to be expected.

The temperature profile in the second reaction zone can be modified as desired through external temperature control. For example, the reaction in the second reaction zone can be carried out adiabatically, isoperibolically (with constant heat flow) or isothermally. Cooling or heating of individual reactor sections in the second reaction zone makes it possible to establish a temperature profile matched to the reactor geometry or to the desired product properties. It is advantageous to allow, through an adiabatic procedure, i.e. with neither heating nor cooling, the temperature in the second reaction zone to rise toward the end. This counters an overproportionate increase in viscosity with increasing conversion and thus enables virtually complete conversion to products having low residual monomer and oligomer contents. This is particularly important if it is desired to avoid major operations, i.e. if immediate packaging of the resultant product—if necessary after destruction of the living chain ends—is desired.

In a particular embodiment of the process, the second reaction zone consists of a one- or multipart tubular reactor without heat exchanger. If desired, a plurality of tubular reactors connected in series can be used.

It is particularly advantageous to continue the polymerization to complete conversion in a tubular reactor without heat exchanger, with the polymerization being continued to a conversion of at least 40% in the first reaction zone.

The residence time in the second reaction zone is, for example, from 0.05 to 1 hour. A residence time of not greater than 0.3 hour is preferred. The reaction is usually carried out at an adequate pressure of up to 10 bar, if necessary even up to 100 bar.

The process enables polymers to be obtained from vinylaromatic monomers with a residual monomer content of less than 50 ppm, a cyclic dimer and trimer content of less than 1000 ppm, a molecular weight distribution $M_w/M_N$ of less than 1.5 and a melt volume index $MVI_{200°\ C./5}$ kg of greater than 4 g/10 min. Given a suitable process procedure, a residual content of less than 250 ppm, perhaps even less than 100 ppm, of monomer can be achieved.

The polymers are particularly suitable for the production of fibers, films and moldings. They can be mixed in a known manner with auxiliaries and fillers or further polymers (to give blends). In a particular embodiment, the process product according to the invention is impact-modified in a known manner by addition of rubber polymers.

EXAMPLES USING TUBULAR REACTORS

Example 1.1

A twin-jacket tubular reactor having an internal diameter of 29.7 mm and a length of 2100 mm, designed for a pressure of up to 100 bar and a temperature of up to 350° C., is supplied, in co-current, with a heat-transfer medium whose entry temperature is 60° C. The reactor is fitted with three thermocouples distributed evenly over the reaction zone. 10 l/h of styrene and 1.1 l/h of ethylbenzene, each at a temperature of 5° C., and 115 ml/h of a correspondingly precooled solution of 10 g of sec-BuLi and 40 g of $(n-Bu)_2Mg$ per liter in ethylbenzene are introduced continuously via three separate pumps.

At the end of the reactor, 100 ml/h of a 20% strength by weight solution of methanol in ethylbenzene is added to the reaction mixture by means of an HPLC pump, and the mixture is homogenized in a downstream tube section fitted with a static mixer for this purpose. The temperature measured at the end of the reactor is 205° C. and is the highest temperature occurring in the system. The glass-clear, colorless polymer melt is released via a butterfly valve into a degassing pot held at 20 mbar, withdrawn by means of a screw pump, extruded and pelletized. The residual monomer content is less than 10 ppm. The space-time yield of the polymer works out at about 6.2 $[kg \cdot l^{-1} \cdot h^{-1}]$. The resultant product has a molecular weight $M_W$ of 104,000 and a nonuniformity $M_W/M_N$ of 1.29.

Example 1.2

The process of Example 1 can be modified as follows for an essentially solvent-free procedure: 15 l/h of styrene having a temperature of 5° C. and 170 ml/h of a solution of 5 g of s-BuLi and 55 g of $(n-Bu)_2Mg$ per 1 in ethylbenzene (cooled to 5° C.) are fed continuously to the reactor via two separate pumps. The temperature measured at the end of the reactor is 226° C. and is the highest temperature occurring in the system.

The reaction product is worked up as described. The residual monomer content is 18 ppm. The space-time yield of the polymer works out at about 9.3 $[kg \cdot l^{-1} \cdot h^{-1}]$. The resultant product has a molecular weight $M_W$ of 149,000 and a nonuniformity $M_W/M_N$ of 1.37.

Example 1.3

15 l/h of styrene having a temperature of 5° C. and 170 ml/h of a solution, cooled to 5° C., of 10 g of n-BuLi and 80 g of $Et_2Zn$ per 1 in ethylbenzene are fed to the reactor described above. The temperature measured at the end of the reactor is 234° C. The space-time yield of the polymer works out at about 9.3 $[kg \cdot l^{-1} \cdot 1h^{-1}]$. The residual monomer content is 23 ppm. The resultant product has a molecular weight $M_W$ of 205,000 and a nonuniformity $M_W/M_N$ of 1.50.

The reaction product is extruded and pelletized as described.

Comparative Experiment 1.1

As described above, 10 l/h of styrene, 1.1 l/h of ethylbenzene and 115 ml/h of a 12% strength solution of s-BuLi are processed. The maximum temperature, which is reached as early as in the center of the reactor, is 266° C.

Reaction and work-up as described above give a product which has a residual monomer content of 132 ppm. The resultant product has a molecular weight $M_W$ of 163,500 and a nonuniformity $M_W/M_N$ of 1.67. In contrast to the products from Examples 1.1–1.3, a GPC analysis-shows a significant proportion of low-molecular-weight polymers and cyclic dimers and trimers.

Comparative Experiment 1.2

As described above, 15 l/h of styrene and 170 ml/h of a 12% strength solution of s-BuLi are processed. A temperature of 285° C. is reached as early as in the center of the reactor. It was not investigated whether higher temperatures are reached elsewhere in the reactor.

Reaction and work-up as described above give a product which has a residual monomer content of 185 ppm. The resultant product has a molecular weight $M_W$ of 229,000 and a nonuniformity $M_W/M_N$ of 2.1 and has a significant content of low-molecular-weight polymers and cyclic dimers and trimers.

EXAMPLES USING STIRRED REACTORS

Example 2.1

The stirred reactor used has a volume of 2 l. The stirrer used is a standard anchor stirrer. The jacket of the twin-jacket reactor is filled with a heat-transfer medium, which allows an isothermal procedure. The heat-transfer medium is passed through the jacket and thermostat. The temperature is measured by two thermocouples directly in the reaction medium and can be varied precisely in association with the thermostats. The reactor is designed for a pressure of 60 bar and for working under a protective gas.

1.5 l/h of styrene are fed to the reactor. In parallel to this, a mixture of 0.43 mmol/h of s-butyllithium (1 M in cyclohexane) as initiator and 8.57 mmol/h of dibutylmagnesium (1 M in heptane) as retarder is fed as a solution to the reactor via a static mixer. The polymerization temperature is set at 105° C. After about three hours, a steady state has been reached, where the solids content (about 30%) no longer changes. The viscous solution is withdrawn continuously, mixed with an amount of isopropanol which is stoichiometric with respect to the retarder/initiator, and treated in a degassing unit at 10 mbar. The melt is discharged using a gear pump, forced through a die and pelletized. The product is clear and colorless. The molecular weight distribution, determined by GPC, has a maximum at 74,000 g/mol and an $M_W/M_N$ ratio of 2.41. The space-time yield of the polymer works out at about 200 $[g \cdot l^{-1} \cdot h^{-1}]$.

Example 2.2

The procedure is similar to that in Example 2.1. 1 l/h of styrene, 0.073 mmol/h of s-butyllithium (1 M in hexane) and 5.9 mmol/h of dibutylmagnesium (1 M in hexane) are introduced into the reactor. The polymerization temperature is set at 120° C.

A steady-state solids content of about 40% is established. The product is clear and colorless. The molecular weight distribution, determined by GPC, has a maximum at 82,000 g/mol and an $M_W/M_N$ ratio of 2.52. The space-time yield of the polymer works out at about 180 $[g \cdot l^{-1} \cdot h^{-1}]$.

Example 2.3

The procedure is similar to that of Example 2.1. 1 l/h of styrene, 9.0 mmol/h of s-butyllithium (1 M in cyclohexane) and 7.65 mmol/h of triisobutylaluminum (1 M in hexane) are fed to the reactor. The polymerization temperature is set at 75° C. A steady-state solids content of about 60% is established. The product is clear and colorless. The molecular weight distribution, determined by GPC, has a maximum at 97,000 g/mol and an $M_W/M_N$ ratio of 2.35. The space-time yield of the polymer works out at about 270 $[g \cdot l^{-1} \cdot h^{-1}]$.

Example 2.4

The procedure is similar to that of Example 2.1. 1 l/h of styrene, 9.0 mmol/h of s-butyllithium (1 M in cyclohexane) and 7.20 mmol/h of diisobutylaluminum hydride (1 M in hexane) are introduced into the reactor at a temperature of 91° C. A steady-state solids content of about 75% is established. The product is clear and colorless. The molecular weight distribution, determined by GPC, has a maximum at 122,000 g/mol and an $M_W/M_N$ ratio of 2.62. The space-time yield of the polymer works out at about 340 $[g \cdot l^{-1} \cdot h^{-1}]$.

Example 2.5

The procedure is similar to that of Example 2.1. 1 l/h of styrene, 9.0 mmol/h of s-butyllithium (1 M in cyclohexane) and 45 mmol/h of trihexylaluminum (1 M in hexane) are introduced into the reactor at a temperature of 79° C. A steady-state solids content of about 50% is established. The product is clear and colorless. The molecular weight distribution, determined by GPC, has a maximum at 89,000 g/mol and an $M_W/M_N$ ratio of 2.27. The 10 space-time yield of the polymer works out at about 230 $[g \cdot l^{-1} \cdot h^{-1}]$.

Example 2.6

1 kg/h of styrene and, separately, 19 g/h of a solution of 0.54 g of s-butyllithium (1.6 M in cyclohexane), 5.2 g of dibutylmagnesium (1 M in heptane) and 13.3 g of cyclohexane are introduced continuously under a protective gas at a fill level of 70% into a twin-jacket 3 l stirred reactor fitted with anchor stirrer, thermocouples, inlets and devices for working under nitrogen. The temperature is held at 95° C.; the solids content of the reaction mixture reaches 45% in steady state.

The product is discharged continuously using a gear pump and worked up as described in Example 2.1. Clear, colorless pellets are obtained. The molecular weight distribution, determined by GPC, has a maximum at 110,000 g/mol and an $M_W/M_N$ ratio of 2.63. The space-time yield of the polymer works out at about 215 $[g \cdot l^{-1} \cdot h^{-1}]$.

Example 2.7

As described in Example 2.6, 750 g/h of styrene and, separately, 19 g/h of a solution of 0.27 g of n-butyllithium (1.4 M in cyclohexane), 5.7 g of dibutylmagnesium (1 M in hexane) and 13.6 g of cyclohexane are fed continuously to the reactor. The temperature is held at 120° C.; the solids content of the reaction mixtures reaches 85% in steady state.

The product is discharged continuously using a gear pump and worked up as described in Example 2.1. Clear, colorless pellets are obtained. The molecular weight distribution, determined by GPC, has a maximum at 102,000 g/mol and an $M_W/M_N$ ratio of 2.91. The space-time yield of the polymer works out at about 300 $[g \cdot l^{-1 \cdot -1}]$.

In order to further investigate the behavior of a back-mixing reactor, some batchwise polymerization experiments were carried out:

Example 2.8

5000 g of styrene are introduced into a 10 l stirred reactor and warmed to 70° C. A premixed catalyst solution comprising 0.7 ml of a 1.6 molar s-butyllithium solution in cyclohexane and 22 ml of a 1 molar dibutylmagnesium solution in n-hexane is added at this temperature. The temperature is then raised to 120° C., and the system is held at this temperature for 5 h. At this point, the reaction mixture has a solids content of 76%. The reaction is terminated using an amount of isopropanol which is stoichiometric with respect to the retarder/initiator, and the mixture is degassed at 8 mbar, discharged using a gear pump and pelletized.

Clear, colorless pellets are obtained with a molecular weight $M_N$, determined by GPC, of 85,000 g/mol and a distribution width $M_{WW}/M_N$ of 1.79.

Example 2.9

The procedure is similar to that in Example 2.8. After 20 h, the reaction mixture has a solids content of 96%. The pellets obtained have a molecular weight $M_N$ of 138,000 g/mol and a distribution width $M_W/M_N$ of 1.92.

Example 2.10

600 g of styrene are introduced into a 1 l stirred reactor, and a mixture of 0.12 ml of a 1.4 molar solution of s-butyllithium in cyclohexane and 8.1 ml of a 1 molar solution of dibutylmagnesium in n-hexane is added. The mixture is heated to 150° C. After 9 minutes, the reaction is terminated using 2 ml of ethanol, giving a clear, viscous solution having a solids content of 51% by weight. The reaction mixture is then degassed at 8 mbar, discharged using a gear pump and pelletized, giving clear, colorless pellets having a molecular weight $M_N$ of 28,000 g/mol and a distribution width $M_W/M_N$ of 1.64.

Example 2.11

45 l of cyclohexane and 3 kg of styrene are introduced into a 100 l reactor fitted with wall cooling and additionally an external heat exchanger (tube-bundle heat exchanger) supplied by a pump, titrated against a 12% strength solution of sec-butyl-lithium in hexane until a pale red coloration remains and heated to 40° C. 140 ml of a solution, 12% strength in overall terms, of a mixture of 1 part by weight of s-butyllithium and 4 parts by weight of dibutylmagnesium in hexane are then added. The temperature remains at 40° C. A mixture of 14 g of butadiene and 3 kg of styrene is then added. Under these conditions, the temperature rises to 53° C. within 30 minutes. The styrene-butadiene-styrene block copolymer obtained has a tear strength of 24 MPa in the DIN 53455 tensile test. A molecular weight $M_W$ of 125,000 and a nonuniformity $M_W/M_N$ of 1.15 are measured.

Comparative Experiment 2.1

The procedure is similar to that in Example 2.11, but no dibutylmagnesium is used. The apparatus used does not allow prevention of a fast temperature rise. In spite of cooling, a temperature of 79° C. is reached within 12 minutes. After addition of the butadiene/styrene mixture, the temperature rises to 139° C. within 12 minutes. The block copolymer obtained has a tear strength of 16 MPa in the DIN 53455 tensile test, an indication that some of the living chains have been terminated by the high temperature. A molecular weight $M_W$ of 145,000 and a nonuniformity $M_W/M_N$ of 1.82 are measured.

Comparative Experiment 2.2

The procedure is similar to that in Example 2.11, but with significantly greater dilution of the monomer or polymer: 60 l of cyclohexane and 1.5 kg of styrene are introduced at the outset and no dibutylmagnesium is used. 70 ml of 12% strength butyllithium solution are used. Initially, no significant temperature rise is observed. In spite of cooling, a temperature of 49° C. is reached within 12 minutes. After addition of 7 kg of butadiene and 1.5 kg of styrene, the temperature rises to 71° C. within 22 minutes. The block copolymer obtained has a tear strength of 23 MPa in the DIN 53455 tensile test. A molecular weight $M_W$ of 131,000 and a nonuniformity $M_W/M_N$ of 1.48 are measured.

Process with a combination of back-mixing and non-back-mixing reaction spaces

Examples 3.1 to 3.6 (results summarized in Table 1)

The experimental unit consists of a 3.5 l heatable and coolable stirred reactor with anchor stirrer, designed for a pressure of 40 bar, and a downstream twin-jacket tubular reactor having an internal diameter of 10 mm and a length of 4000 mm (reactor volume 0.314 l), designed for a pressure of 100 bar. The stirred reactor has two and the tubular reactor three thermocouples distributed uniformly over the reaction zone. The two reactors are connected by a heatable gear pump.

To start with, the stirred reactor is filled first (fill level 1.5 liters), the polymerization is started and, when the proposed conversion (solids content) has been reached, the connection to the tubular reactor is made in order to achieve steady-state, continuous operation.

The amount of styrene needed for a residence time of one hour, namely 1.5 l/h, is fed continuously via one pump and a mixture, freshly prepared under a protective gas, of 1-molar solutions of s-butyllithium in cyclohexane and dibutylmagnesium in heptane in a ratio of 1:5 (for Example 1: corresponding to hourly amounts of 1.2 and 6 mmol respectively) is fed continuously via a further pump to the stirred reactor, which is preheated to 50° C., and the mixture is polymerized to a conversion of 40% (solids content) at a material temperature of 50° C. Once the desired conversion has been reached, the corresponding amount is fed to the tubular reactor and polymerized to completion without heat dissipation. The temperature measured at the end of the reactor is the highest temperature occurring in the system and is in each case 180° C., and the residence time in the tubular reactor is 10 minutes. The reaction product is released via a butterfly valve into a pot held at 20 mbar. The glass-clear, colorless polymer melt is discharged by means of a gear pump via a die head, extruded and pelletized.

The residual monomer content is determined by gas chromatography, the molecular weight ratio $M_W/M_N$ by gel permeation chromatography (polystyrene standard; column material crosslinked polystyrene; solvent THF). The melt volume index $MVI_{200° C./5 kg}$ is determined in accordance with DIN 53735.

The space-time yield, based on the volume of the entire unit (fill volume of the prereactor+volume of the tubular reactor), works out at about 0.8 [kg·l$^{-1}$·h$^{-1}$].

Comparative Experiment C 3.1

Only the unit's stirred reactor is used. This is charged with 1.5 l of styrene and 7.2 mmol of sec-butyllithium (1 M in cyclohexane) at 30° C. The temperature rises to 282° C. within one minute. The worked-up polymer has a residual monomer content of 580 ppm.

Comparative Experiment C 3.2

Comparative Experiment 3.1 is repeated without using dibutylmagnesium as retarder, but with a dilute monomer solution. To this end, a solution of 0.3 l/h of styrene in 1.2 l/h of ethylbenzene and 1.42 mmol/h of s-butyllithium (1 M in cyclohexane) is introduced into the stirred reactor.

TABLE 1

| | | \multicolumn{8}{c}{Examples/Comparative Experiments} |
|---|---|---|---|---|---|---|---|---|---|
| | | 3.1 | 3.2 | 3.3 | 3.4 | 3.5 | 3.6 | C3.1 | C3.2 |
| Styrene | [l/h] | 1.5 | 1.5 | 1.5 | 1.5 | 1.5 | 1.5 | 1.5 | 0.3 |
| Ethylbenzene | [l/h] | — | — | — | — | — | — | — | 1.2 |
| sec-Butyllithium | [mmol/h] | 1.2 | 0.9 | 0.66 | 7.2 | 4.32 | 7.2 | 7.2 | 1.42 |
| Dibutylmagnesium | [mmol/h] | 6.0 | 6.3 | 6.6 | — | 2.88 | — | — | — |
| Triisobutylaluminum | [mmol/h] | — | — | — | 4.32 | 1.72 | 6.5 | — | — |
| Temp. in the stirred reactor (tubular reactor inlet) | [° C.] | 50 | 80 | 120 | 70 | 50 | 130 | (282) | 80 |
| Residual monomer content | [ppm] | 10 | 13 | 13 | 11 | 10 | 12 | 580 | 18 |
| Space-time yield | [kg $l^{-1}h^{-1}$] | | 0.8 | 0.8 | 0.8 | 0.8 | 0.8 | — | 0.16 |
| $M_W/M_N$ | | 3.1 | 2.9 | 3.5 | 3.1 | 2.9 | 3.3 | — | 1.08 |
| $MVI_{200°C./5\ kg}$ | [g/10 min] | 6 | 5.9 | 6.3 | 6.1 | 5.9 | 6.2 | — | 2.6 |

Comparative Experiments C 3.1 and C 3.2 show that, in an arrangement as used to carry out the examples according to the invention, the reaction without use of a retardent additive, such as dibutylmagnesium or tributylaluminum, is either (without dilution) uncontrollable (C 3.1) or, with corresponding dilution, allows only a low space-time yield. Apart from significantly higher space-time yields and significantly higher melt volume indices MVI, Examples 3.1 to 3.6 according to the invention produce polymers having significantly broader molecular weight distributions.

EXAMPLES OF NOVEL INITIATOR MIXTURES

The examples are summarized in Tables 2–5. In a vacuum apparatus equipped for working under a protective gas, 20 g of styrene and the corresponding amount of alkylmetal compound are transferred at low temperature into a glass ampule, melted and mixed thoroughly. The ampule is then immersed into a heating bath at the stated temperature. After the stated time, complete conversion is achieved in each case. The effective initiator concentration $C_{(Li)}$ is determined as the quotient of the theoretical number-average molecular weight based on the amount of s-BuLi employed and the number-average molecular weight $M_N$ actually found by GPC.

TABLE 2

Dibutylmagnesium (DBM) as retarder

| | Experiment 1 | Experiment 2 | Experiment 3 | Experiment 4 |
|---|---|---|---|---|
| DBM [mhm]* | 11 | 15 | 20 | 40 |
| s-BuLi [mhm]* | 1 | 1 | 1 | 1 |
| Temp. [° C.] | 75 | 90 | 120 | 150 |
| Time [h] | 1 | 1 | 1 | 1 |
| $C_{[Li]}$ | 2 | 2.5 | 3 | 3 |

*mhm = mmol per 100 g of styrene

TABLE 3

Triisobutylaluminum (TIBA) as retarder

| | Experiment 1 | Experiment 2 | Experiment 3 | Experiment 4 |
|---|---|---|---|---|
| TIBA [mhm]* | 0.9 | 0.95 | 0.95 | 0.97 |
| s-BuLi [mhm]* | 1 | 1 | 1 | 1 |
| Temp. [° C.] | 150 | 165 | 180 | 200 |

TABLE 3-continued

Triisobutylaluminum (TIBA) as retarder

| | Experiment 1 | Experiment 2 | Experiment 3 | Experiment 4 |
|---|---|---|---|---|
| Time [h] | 1 | 0.8 | 0.4 | 0.2 |
| $C_{[Li]}$ | 2 | 2 | 2 | 2 |

*mhm = mmol per 100 g of styrene

TABLE 4

Tri-n-hexylaluminum (THA) as retarder

| | Experiment 1 | Experiment 2 | Experiment 3 | Experiment 4 |
|---|---|---|---|---|
| (THA) [mhm]* | 10 | 12 | 15 | 18 |
| (s-BuLi) [mhm]* | 1 | 1 | 1 | 1 |
| Temp. [° C.] | 80 | 100 | 120 | 150 |
| Time [h] | 2 | 1.4 | 0.8 | 0.3 |
| $C_{[Li]}$ | 1 | 1 | 1.5 | 2 |

*mhm = mmol per 100 g of styrene

TABLE 5

Dibutylzinc (DBZ) as retarder

| | Experiment 1 | Experiment 2 | Experiment 3 | Experiment 4 |
|---|---|---|---|---|
| (DBZ) [mhm]* | 11 | 14 | 17 | 20 |
| s-BuLi [mhm]* | 1 | 1 | 1 | 1 |
| Temp. [° C.] | 80 | 100 | 130 | 150 |
| Time [h] | 1 | 1 | 1 | 1 |
| $C_{[Li]}$ | 2 | 2.5 | 3 | 3 |

*mhm = mmol per 100 g of styrene

We claim:
1. A process for the continuous polymerization of styrene monomers or block copolymerization of styrene and diene monomers using an alkali metal alkyl or aryl compound A as polymerization initiator, which comprises carrying out the polymerization in the presence of an alkyl- or arylmetal compound B of the formula $R^2_n M^2$ as rate regulator, where
   $M^2$ is an n-valent element from group 2a, 2b or 3a of the Periodic Table, with the exception of boron; and
   $R^2$ independently of one another are hydrogen, halogen, $C_1-C_{20}$-alky or $C_6-C_{20}$-aryl, wherein the initiator contains no Lewis base with the proviso that at least one radical $R^2$ is $C_1$–$C_{20}$ or $C_6$–$C_{20}$-aryl.

2. A process as claimed in claim 1, wherein the alkali metal alkyl or aryl compound A and the alkyl- or arylmetal compound B are used in a molar ratio between B and A of from 0.1:1 to 500:1.

3. A process as claimed in claim 1, wherein an alkali metal alkyl or aryl compound A of the formula $R^1M^1$, where $M^1$ is Li, Na or K;

$R^1$ is $C_1$–$C_{20}$-alkyl, $C_6$–$C_{20}$-aryl, or $C_7$–$C_{20}$-alkyl-substituted aryl or an equivalent amount, based on $M^1$, of an initiator-capable, low-molecular-weight product A' of the formula $R^3(M^1)_x$ of the reaction of the alkali metal alkyl or aryl compound A, where X is an integer from 2 to 5, and $R^3$ is the x-valent radical of an aliphatic, aromatic-aliphatic or aromatic hydrocarbon.

4. A process as claimed in claim 1, wherein an alkyl- or arylmetal halide or alkyl- or arylmetal hydride is used.

5. A process as claimed in claim 1, wherein styrene, α-methylstyrene, p-methylstyrene, 1,1-diphenylethylene, butadiene or isoprene, or a mixture thereof, is used.

6. A process as claimed in claim 1, wherein the solvent used is toluene, cyclohexane, methylcyclohexane, hexane, heptane, ethylbenzene or decalin, and the initial monomer concentration is at least 50% by weight.

7. A process as claimed in claim 1, wherein the polymerization is carried out under non-isothermal conditions and essentially without back-mixing, the temperature reached at the reactor outlet being at least 100° C.

8. A process as claimed in claim 7, wherein the temperature reached at the reactor outlet is kept below 250° C.

9. A process as claimed in claim 7, wherein the reaction is carried out in a tubular or tube-bundle reactor.

10. A process as claimed in claim 1, wherein the polymerization is carried out in a back-mixing reaction space, and fresh polymerization initiator and/or rate regulator is constantly supplied together with or separately from the monomer.

11. A process as claimed in claim 10, wherein the back-mixing reaction space used is a stirred reactor.

12. A process as claimed in claim 10, wherein the back-mixing reaction space used is a circulation reactor.

13. A process as claimed in claim 10, wherein, in order to complete the conversion, a non-back-mixing reaction space is arranged downstream of the back-mixing reaction space.

14. A process as claimed in claim 13, wherein the polymerization is continued to a conversion of from 20 to 80% by weight in the back-mixing reaction space and is completed in the non-back-mixing reaction space.

15. A process as claimed in claim 13, wherein the non-back-mixing reaction space used is a tubular reactor.

16. A process as claimed in claim 15, wherein the tubular reactor has no heat exchanger.

17. A process as claimed in claim 10, wherein the reaction in the back-mixing reaction space is carried out under essentially isothermal conditions at a temperature below 200° C.

18. A process as claimed in claim 10, wherein the reaction in the back-mixing reaction space is carried out under essentially isothermal conditions at a temperature below 150° C.

19. An initiator for anionic polymerization, consisting of an alkyl- or arylmetal compound A of the formula $R^1M^1$ and an alkyl- or arylmetal compound B of the formula $R^1_n M^2$ in a molar ratio between B and A of from 10:1 to 100:1 is used, where $M^1$ is Li, Na or K;

$R^1$ is $C_1$–$C_{20}$-alky, $C_6$–$C_{20}$-aryl, or $C_7$–$C_{20}$-alky-substituted aryl;

$M^2$ is an n-valent element from group 2a, 2b or 3a of the Periodic Table, with the exception of boron; and $R^2$ independently of one another are hydrogen, halogen, $C_1$–$C_{20}$-alky, or $C_6$–$C_{20}$-aryl, with the proviso that at least one radical $R^2$ is $C_1$–$C_{20}$ or $C_6$–$C_{20}$-aryl.

20. An initiator as claimed in claim 19, wherein the alkyl- or arylmetal compound A is replaced by an equivalent amount, based on $M^1$, of an initiator-capable, low-molecular-weight product A' of the formula $R^3(M^1)_x$ of the reaction of the alkali metal alkyl or aryl compound A, where x is an integer from 2 to 5, and $R^3$ is the x-valent radical of an aliphatic, aromatic-aliphatic or aromatic hydrocarbon.

21. An initiator as claimed in claim 19, wherein the alkyl- or arylmetal compound B is an alkaline earth metal, zinc or aluminum alkyl or aryl compound containing alkyl or aryl radicals each having 1 or 6 to 10 carbon atoms respectively.

22. An initiator as claimed in claim 21, wherein the alkylmetal compound B is dibutylmagnesium, dibutylzinc, triisobutylaluminum or tri-n-hexylaluminum.

23. A solution of an initiator as claimed in claim 19 in an aliphatic or cycloaliphatic hydrocarbon.

24. A process for the continuous polymerization of styrene as claimed in claim 1 carried out in the presence of polybutadiene or styrene-butadiene block copolymers to produce a high-impact polystyrene.

* * * * *